(12) United States Patent
Brubaker et al.

(10) Patent No.: US 11,327,947 B1
(45) Date of Patent: May 10, 2022

(54) SYSTEM FOR IDENTIFYING, TAGGING, AND MONITORING DATA FLOW IN A SYSTEM ENVIRONMENT

(71) Applicant: BANK OF AMERICA CORPORATION, Charlotte, NC (US)

(72) Inventors: Mark Earl Brubaker, Simi Valley, CA (US); Elisabeth Loeber Shore, McKinney, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 17/140,528

(22) Filed: Jan. 4, 2021

(51) Int. Cl.
| G06F 16/00 | (2019.01) |
| G06F 16/23 | (2019.01) |
| G06F 16/2455 | (2019.01) |
| G06F 16/28 | (2019.01) |
| G06F 21/62 | (2013.01) |
| G06F 16/22 | (2019.01) |

(52) U.S. Cl.
CPC .......... G06F 16/2358 (2019.01); G06F 16/22 (2019.01); G06F 16/24568 (2019.01); G06F 16/287 (2019.01); G06F 21/6227 (2013.01); G06F 2221/2141 (2013.01)

(58) Field of Classification Search
CPC ............. G06F 16/2358; G06F 16/22; G06F 16/24556; G06F 16/287; G06F 21/6227; G06F 2221/2141
See application file for complete search history.

(56) References Cited

U.S. PATENT DOCUMENTS

| 5,481,741 | A | * | 1/1996 | McKaskle | G06T 1/20 |
| | | | | | 345/522 |
| 6,418,453 | B1 | | 7/2002 | Kraft et al. | |
| 7,093,012 | B2 | | 8/2006 | Olstad et al. | |
| 7,191,180 | B2 | * | 3/2007 | Evans | H04L 67/2847 |
| 7,577,671 | B2 | | 8/2009 | Joshi et al. | |
| 7,752,207 | B2 | | 7/2010 | Buzsaki et al. | |
| 7,890,612 | B2 | * | 2/2011 | Todd | H04L 63/1483 |
| | | | | | 709/220 |

(Continued)

OTHER PUBLICATIONS

Libdft: practical dynamic data flow tracking for commodity systems, Vasilelos et al., ACM (Year: 2012).*

(Continued)

*Primary Examiner* — Jean M Corrielus
(74) *Attorney, Agent, or Firm* — Moore & Van Allen PLLC; R. W. McCord Rayburn (57) ABSTRACT

Systems, computer program products, and methods are described herein for identifying, tagging, and monitoring data flow in a system environment. The present invention may be configured to receive data sets generated by applications for storage in data structures, generate unique identifiers for the data sets, and add the unique identifiers to the data sets. The present invention may be further configured to monitor, based on the unique identifiers, access to and movement of the data sets, generate, based on monitoring the access to and the movement of the data sets, flow data, and generate, based on the flow data, a data flow model. The present invention may be further configured to provide, to a user device, a graphical user interface for display by the user device, where the graphical user interface includes information based on the data flow model.

20 Claims, 4 Drawing Sheets

(56) References Cited

U.S. PATENT DOCUMENTS

| | | |
|---|---|---|
| 8,042,112 B1 | 10/2011 | Zhu et al. |
| 8,707,313 B1 | 4/2014 | Zhu et al. |
| 8,832,052 B2 | 9/2014 | Elsen |
| 8,972,375 B2 | 3/2015 | Opalinski et al. |
| 9,652,538 B2 | 5/2017 | Shivaswamy et al. |
| 10,891,145 B2 * | 1/2021 | Wagner ............... G06F 9/45516 |
| 2018/0024901 A1 * | 1/2018 | Tankersley ............ G06T 11/206 |
| | | 707/694 |
| 2021/0019284 A1 * | 1/2021 | Bowman ............... G06F 16/137 |
| 2021/0026805 A1 * | 1/2021 | Bowman ................. G06F 3/061 |
| 2021/0026806 A1 * | 1/2021 | Bowman ............... G06F 16/221 |
| 2021/0042265 A1 * | 2/2021 | Bowman ................. G06F 3/064 |

OTHER PUBLICATIONS

Understanding and Visualizing Full Systems with Data Flow Tomography, Shashidhar et al., ACM (Year: 2008).*

* cited by examiner

SYSTEM FOR IDENTIFYING, TAGGING, AND MONITORING DATA FLOW IN A SYSTEM ENVIRONMENT

FIELD OF THE INVENTION

The present invention embraces a system for identifying, tagging, and monitoring data flow in a system environment.

BACKGROUND

Present conventional systems do not have the capability to track data or changes to data as data moves within an entity. For example, users associated with the entity may use data, move data, duplicate data, change data, and/or the like such that an origin of the data or changes made to the data are no longer identifiable. Access controls may be placed on data structures storing data, but, after a user moves the data, the access controls may no longer be in place.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for identifying, tagging, and monitoring data flow in a system environment is presented. The system may include at least one non-transitory storage device and at least one processing device coupled to the at least one non-transitory storage device, where the at least one processing device is configured to receive data sets generated by applications for storage in data structures, generate unique identifiers for the data sets by generating, for each data set, a unique identifier including origin information of the data set, add the unique identifiers to the data sets by adding, to each data set, the unique identifier generated for the data set, monitor, based on the unique identifiers, access to and movement of the data sets by monitoring the applications accessing the data sets, movement of the data sets from the data structures to the applications, movement of the data sets between the applications, movement of the data sets from the applications to the data structures, and movement of the data sets between the data structures, generate, based on monitoring the access to and the movement of the data sets, flow data, generate, based on the flow data, a data flow model including inter-application relationships between the applications, application-data-structure relationships between the applications and the data structures, and inter-data-structure relationships between the data structures, and provide, to a user device, a graphical user interface for display by the user device, where the graphical user interface includes information based on the data flow model.

In some embodiments, the at least one processing device is configured to detect changes in one or more data sets of the data sets, generate, based on detecting the changes in the one or more data sets and for each data set of the one or more data sets, a new unique identifier including the origin information of the data set and information identifying an application, of the applications, that changed the data set, and add, to each data set of the one or more data sets, the new unique identifier generated for the data set.

In some embodiments, the at least one processing device is configured to detect a change in a first data set of the data sets, where a first application of the applications made the change to the first data set, generate, based on detecting the change in the first data set, a new unique identifier including the origin information of the first data set and information identifying the first application, and add the new unique identifier to the first data set.

In some embodiments, the at least one processing device is configured to, when monitoring, based on the unique identifiers, access to and movement of the data sets, inspect payloads of packets comprising the data sets to determine the unique identifiers in the payloads and determine, based on the unique identifiers and for each data set of the data sets, whether an access control is associated with the data set.

In some embodiments, the at least one processing device is configured to receive, from the user device, a query including a first set of applications from the applications, determine, based on the data flow model, first inter-application relationships between the first set of applications, first application-data-structure relationships between the first set of applications and a first set of data structures from the data structures with which the first set of applications has an application-data-structure relationship, and first inter-data-structure relationships between the first set of data structures, generate, based on determining the first inter-application relationships, the first application-data-structure relationships, and the first inter-data-structure relationships, a first data flow model for the first set of applications, and provide, to the user device, a first graphical user interface for display by the user device, where the first graphical user interface includes information based on the first data flow model.

In some embodiments, the unique identifier for each data set includes at least one of an application identifier of an application that generated the data set, information based on a time and date on which the data set was generated, or a randomly generated string of characters unique to the data set.

In some embodiments, the graphical user interface includes a visualization, based on the data flow model, depicting one or more of the applications, one or more of the data structures, one or more of the inter-application relationships, one or more of the application-data-structure relationships, and one or more of the inter-data-structure relationships.

In some embodiments, the at least one processing device is configured to receive, from the user device, a query including a first data set of the data sets and a time period, determine, based on the flow data, a first set of applications, from the applications, and a first set of data structures, from the data structures, where each of the first set of applications and the first set of data structures are associated with access to and the movements of the first data set during the time period, and provide, to the user device, a first graphical user interface for display by the user device, where the first graphical user interface includes information identifying the first set of applications and the first set of data structures.

In some embodiments, the at least one processing device is configured to determine, based on the data flow model, first inter-application relationships between the first set of applications, first application-data-structure relationships between the first set of applications and the first set of data structures, and first inter-data-structure relationships between the first set of data structures and generate, based on determining the first inter-application relationships, the first application-data-structure relationships, and the first inter-data-structure relationships, a first data flow model, and where the first graphical user interface includes information based on the first data flow model.

In some embodiments, the first graphical user interface includes a visualization, based on the first data flow model, depicting the first set of applications, the first set of data structures, the first inter-application relationships, the first application-data-structure relationships, the first inter-data-structure relationships, and movements of the first data set during the time period.

In some embodiments, the visualization, when depicting movements of the first data set during the time period, depicts the first data set using an initial value of a visual characteristic and depicts, after the first data set is changed, the first data set using a second value of a visual characteristic.

In some embodiments, the at least one processing device is configured to, when monitoring access to and movement of the data sets, detect that a first user having a first access control level attempted to transmit a first data set to a second user having a second access control level, determine whether the second access control level is lower than the first access control level, prevent, based on determining that the second access control level is lower than the first access control level, transmission of the first data set to the second user, provide, to a third user, a notification requesting an authorization of the transmission, and permit, based on receiving the authorization from the third user, the transmission of the first data set to the second user.

In some embodiments, the at least one processing device is configured to, when adding the unique identifiers to the data sets, add, for each data set, the unique identifier generated for the data set to a payload for transmitting the data set.

In some embodiments, the at least one processing device is configured to detect a change in a first data set of the data sets, at least one of determine, based on the flow data, whether the change in the first data set is unexpected or determine, based on predetermined rules, whether the change in the first data set is not permitted, and provide, to a user and based on determining that the change in the first data set is unexpected or not permitted, a notification including information associated with the change in the first data set.

In some embodiments, the at least one processing device is configured to, when determining whether the change in the first data set is unexpected, determine, using artificial intelligence, whether the change in the first data set is unexpected.

In another aspect, a computer program product for identifying, tagging, and monitoring data flow in a system environment is presented. The computer program product may include a non-transitory computer-readable medium including code causing a first apparatus to receive data sets generated by applications for storage in data structures, generate unique identifiers for the data sets by generating, for each data set, a unique identifier including origin information of the data set, add the unique identifiers to the data sets by adding, to each data set, the unique identifier generated for the data set, monitor, based on the unique identifiers, access to and movement of the data sets by monitoring the applications accessing the data sets, movement of the data sets from the data structures to the applications, movement of the data sets between the applications, movement of the data sets from the applications to the data structures, and movement of the data sets between the data structures, generate, based on monitoring the access to and the movement of the data sets, flow data, generate, based on the flow data, a data flow model including inter-application relationships between the applications, application-data-structure relationships between the applications and the data structures, and inter-data-structure relationships between the data structures, and provide, to a user device, a graphical user interface for display by the user device, where the graphical user interface includes information based on the data flow model.

In some embodiments, the non-transitory computer-readable medium includes code causing the first apparatus to detect changes in one or more data sets of the data sets, generate, based on detecting the changes in the one or more data sets and for each data set of the one or more data sets, a new unique identifier including the origin information of the data set and information identifying an application, of the applications, that changed the data set, and add, to each data set of the one or more data sets, the new unique identifier generated for the data set.

In some embodiments, the non-transitory computer-readable medium includes code causing the first apparatus to detect a change in a first data set of the data sets, where a first application of the applications made the change to the first data set, generate, based on detecting the change in the first data set, a new unique identifier including the origin information of the first data set and information identifying the first application, and add the new unique identifier to the first data set.

In some embodiments, the non-transitory computer-readable medium includes code causing the first apparatus to, when monitoring, based on the unique identifiers, access to and movement of the data sets, inspect payloads of packets including the data sets to determine the unique identifiers in the payloads and determine, based on the unique identifiers and for each data set of the data sets, whether an access control is associated with the data set.

In yet another aspect, a method for identifying, tagging, and monitoring data flow in a system environment is presented. The method may include receiving data sets generated by applications for storage in data structures, generating unique identifiers for the data sets by generating, for each data set, a unique identifier including origin information of the data set, adding the unique identifiers to the data sets by adding, to each data set, the unique identifier generated for the data set, monitoring, based on the unique identifiers, access to and movement of the data sets by monitoring the applications accessing the data sets, movement of the data sets from the data structures to the applications, movement of the data sets between the applications, movement of the data sets from the applications to the data structures, and movement of the data sets between the data structures, generating, based on monitoring the access to and the movement of the data sets, flow data, generating, based on the flow data, a data flow model including inter-application relationships between the applications, application-data-structure relationships between the applications and the data structures, and inter-data-structure relationships between the data structures, and providing, to a user device, a graphical user interface for display by the user device, where the graphical user interface includes information based on the data flow model.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, the data may be related to products, services, and/or the like offered and/or provided by the entity, customers of the entity, other aspects of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include a graphical user interface (GUI) and/or an interface to input computer-executable instructions that direct a processing device to carry out functions. The user interface may employ input and/or output devices to input data received from a user and/or output data to a user. Input devices and/or output devices may include a display, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted into and/or removed from the external apparatus by a user, and/or the like.

As used herein, "authentication credentials" may be any information that may be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

Figure 1:
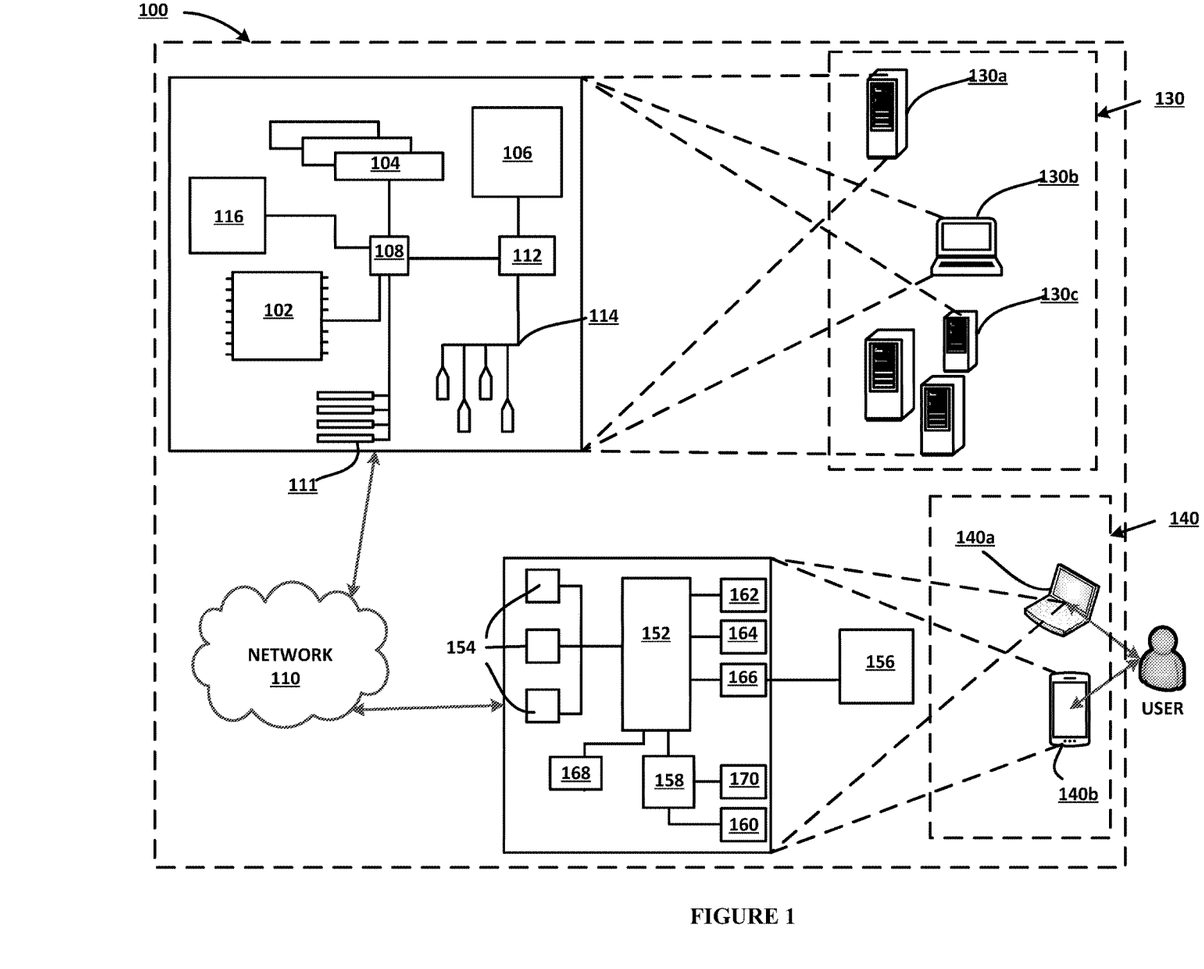
FIG. 1 illustrates technical components of a system environment for a system for identifying, tagging, and monitoring data flow in a system environment, in accordance with an embodiment of the invention.

FIG. 1 presents an exemplary block diagram of a system environment 100 for identifying, tagging, and monitoring data flow in a system environment within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device 140b, a non-mobile computing device 140a, and/or the like. The user may be a person who uses the user input system 140 to access, view modify, interact with, and/or the like information, data, images, video, and/or the like. The user may be a person who uses the user input system 140 to execute resource distributions and/or allocations of resources using one or more applications stored thereon. The one or more applications may be configured to communicate with the system 130, execute a resource distribution and/or an allocation of resources, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for identifying, tagging, and monitoring data flow in a system environment, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, and/or the like. The system 130 may be located at a facility associated with the entity and/or remotely from the facility associated with the entity.

The memory 104 may store information within the system 130. In one implementation, the memory 104 may be a volatile memory unit or units, such as volatile random access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server 130*a* or multiple times in a group of such servers 130*c*. Additionally, or alternatively, the system 130 may be implemented as part of a rack server system, a personal computer, such as a laptop 130*b*, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user can provide input to the computer, and/or a pointing device (e.g., a mouse or a trackball) by which the user can provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

Figure 2:
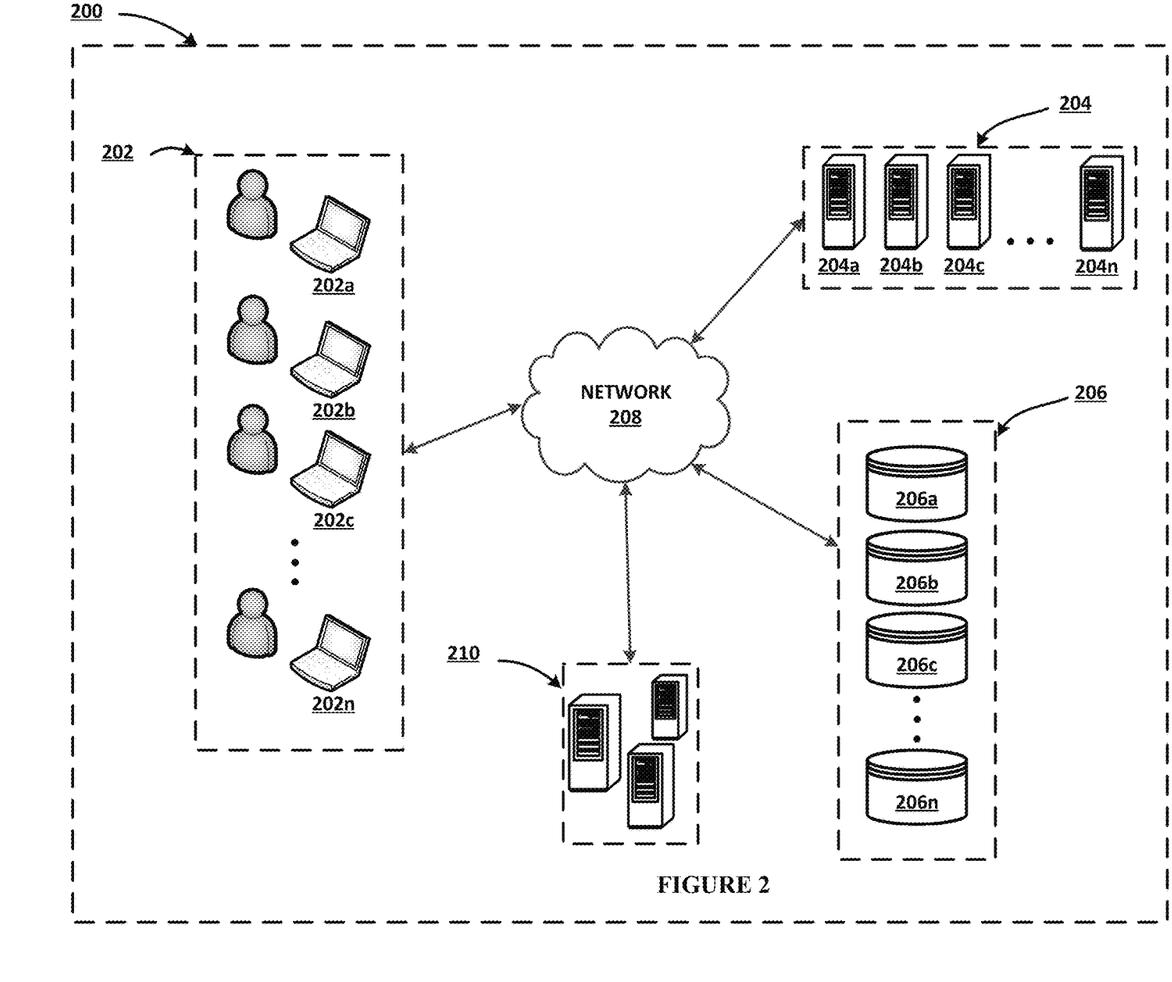
FIG. 2 illustrates a system environment for a system for identifying, tagging, and monitoring data flow in a system environment, in accordance with an embodiment of the invention.

FIG. 2 presents an exemplary diagram of a system environment 200 for identifying, tagging, and monitoring data flow in a system environment within a technical environment, in accordance with an embodiment of the invention. In some embodiments, the system environment 200 may be associated with an entity. As shown in FIG. 2, the system environment 200 may include a plurality of user input systems 202, a plurality of entity systems 204, a plurality of data structures 206, a network 208, and a data flow management system 210. In some embodiments, and as shown in FIG. 2, the plurality of user input systems 202, the plurality of entity systems 204, the plurality of data structures 206, and/or the data flow management system 210 may be connected to the network 208. Additionally, or alternatively, one or more of the user input systems 202, one or more of the entity systems 204, one or more of the data structures 206, the network 208, and/or the data flow management system 210 may be similar to the user input system 140, the system 130, and/or the network 110 as shown in and described herein with respect FIG. 1.

As shown in FIG. 2, the plurality of user input systems 202 may include user input system 202a, user input system 202b, user input system 202c, and additional user input systems as represented by user input system 202n. In some embodiments, the system environment 200 may include one or more user input system 202. As also shown in in FIG. 2, the user input systems 202 may be associated with users (e.g., each of the user input systems 202 may be associated with a user and/or the like).

As shown in FIG. 2, the plurality of entity systems 204 may include entity system 204a, entity system 204b, entity system 204c, and additional entity systems as represented by entity system 204n. In some embodiments, the system environment 200 may include one or more entity systems 204.

As shown in FIG. 2, the plurality of data structures 206 may include data structure 206a, data structure 206b, data structure 206c, and additional data structures as represented by data structure 206n. In some embodiments, the system environment 200 may include one or more data structures 206.

Although the data flow management system 210 is shown in FIG. 2 as being separate from the user input systems 202, the entity systems 204, the data structures 206, and the network 208, the data flow management system 210 may be integrated within the user input systems 202, the entity systems 204, the data structures 206, and the network 208. For example, the data flow management system 210 may be and/or include interceptors, crawlers, and/or the like (e.g., installed on the user input systems 202, the entity systems 204, the data structures 206, and the network 208) for identifying and/or tracking data in the system environment 200, monitoring access to and movement of data in the system environment 200, generating flow data (e.g., in the data structures 206 and/or the like) based on monitoring the access to and the movement of the data, and/or the like.

As noted above, conventional systems do not have the capability to track data or changes to data as data moves within an entity. For example, users associated with the entity may use data, move data, duplicate data, change data, and/or the like such that an origin of the data or changes made to the data are no longer identifiable. Access controls may be placed on databases and/or data structures storing data, but, after a user moves the data, the access controls may no longer be in place. For example, the data structure 206a may have a higher access control level than the data structure 206b, but if a user (e.g., using user input system 202a) with authentication credentials to obtain authorized access to the data structure 206a moves, duplicates, changes, and/or the like data from the data structure 206a and stores the data in the data structure 206b, the data may no longer be protected by the higher access control level and may be subject to unauthorized access. Such unauthorized access may consume resources, such as computing resources (e.g., processing resources, memory resources, power resources, communication resources, and/or the like), network resources, physical resources (e.g., power, lifespan of equipment, and/or the like), financial resources, and/or the like associated with detecting the unauthorized access, reversing the unauthorized access, reporting the unauthorized access, mitigating the unauthorized access, and/or the like.

Furthermore, the entity may, after an impacting event, need to reconstruct databases and/or systems, but may not have enough knowledge of downstream and/or upstream data flows associated with the databases and/or systems that need reconstruction. A user, such as a manager of a system, may assert knowledge of sources of data for the system, but may be unaware that those sources receive data from additional systems and/or databases. For example, a user may know that the entity system 204a obtains data directly from the entity system 204b and the data structure 206a. However, the user may not know that the entity system 204b obtains some and/or all of the data provided by the entity system 204b to the entity system 204a from the entity system 204c, the data structure 206b, the data structure 206c, other entity systems 204, and/or other entity systems 206. Accordingly, the entity may not have enough information to reconstruct the system environment. Such a lack of knowledge and/or information regarding data flows associated with systems and/or data structures may consume resources, such as computing resources (e.g., processing resources, memory resources, power resources, communication resources, and/or the like), network resources, physical resources (e.g., power, lifespan of equipment, and/or the like), financial resources, and/or the like associated with reconstructing and/or repairing systems and/or data structures after an impacting event.

Some embodiments described herein provide a system, a computer program product, and/or a method for identifying, tagging, and monitoring data flow in a system environment. For example, a system may be configured to receive data sets generated by applications for storage in data structures, generate unique identifiers for the data sets by generating, for each data set, a unique identifier including origin information of the data set, add the unique identifiers to the data sets by adding, to each data set, the unique identifier generated for the data set (e.g., tagging the data set), monitor, based on the unique identifiers, access to and movement of the data sets by monitoring the applications accessing the data sets, movement of the data sets from the data structures to the applications, movement of the data sets between the applications, movement of the data sets from the applications to the data structures, and movement of the data sets between the data structures, generate, based on monitoring the access to and the movement of the data sets, flow data, generate, based on the flow data, a data flow model including inter-application relationships between the applications, application-data-structure relationships between the applications and the data structures, and inter-data-structure relationships between the data structures, and provide, to a user device, a graphical user interface for display by the user device, where the graphical user interface includes information based on the data flow model. By monitoring, based on the unique identifiers, access to and movement of the data sets and generating the flow data and the data flow model, the system may provide knowledge and/or information regarding data flows associated with systems and/or data structures, which conserves resources, such as computing resources (e.g., processing resources, memory resources, power resources, communication resources, and/or the like), network resources, physical resources (e.g., power, lifespan of equipment, and/or the like), financial resources, and/or the like associated with reconstructing and/or repairing systems and/or data structures after an impacting event.

In some embodiments, the system may be configured to detect changes in one or more data sets of the data sets, generate, based on detecting the changes in the one or more data sets and for each data set of the one or more data sets, a new unique identifier including the origin information of the data set and information identifying an application, of the applications, that changed the data set, and add, to each data set of the one or more data sets, the new unique identifier generated for the data set (e.g., tag the data set). By detecting changes in data sets, the system may conserve resources, such as computing resources (e.g., processing resources, memory resources, power resources, communication resources, and/or the like), network resources, physical resources (e.g., power, lifespan of equipment, and/or the like), financial resources, and/or the like that would otherwise be consumed by detecting unauthorized access, reversing unauthorized access, reporting unauthorized access, mitigating unauthorized access, and/or the like.

In some embodiments, the system may be configured to detect that a first user having a first access control level attempted to transmit a first data set to a second user having a second access control level, determine whether the second access control level is lower than the first access control level, prevent, based on determining that the second access control level is lower than the first access control level, transmission of the first data set to the second user, provide, to a third user, a notification requesting an authorization of the transmission, and permit, based on receiving the authorization from the third user, the transmission of the first data set to the second user. By detecting that a user transmitted a data set to another user with a different access control level, preventing the transmission, and requesting authorization of the transmission, the system may conserve resources, such as computing resources (e.g., processing resources, memory resources, power resources, communication resources, and/or the like), network resources, physical resources (e.g., power, lifespan of equipment, and/or the like), financial resources, and/or the like that would otherwise be consumed by detecting unauthorized access, reversing unauthorized access, reporting unauthorized access, mitigating unauthorized access, and/or the like.

Figure 3:
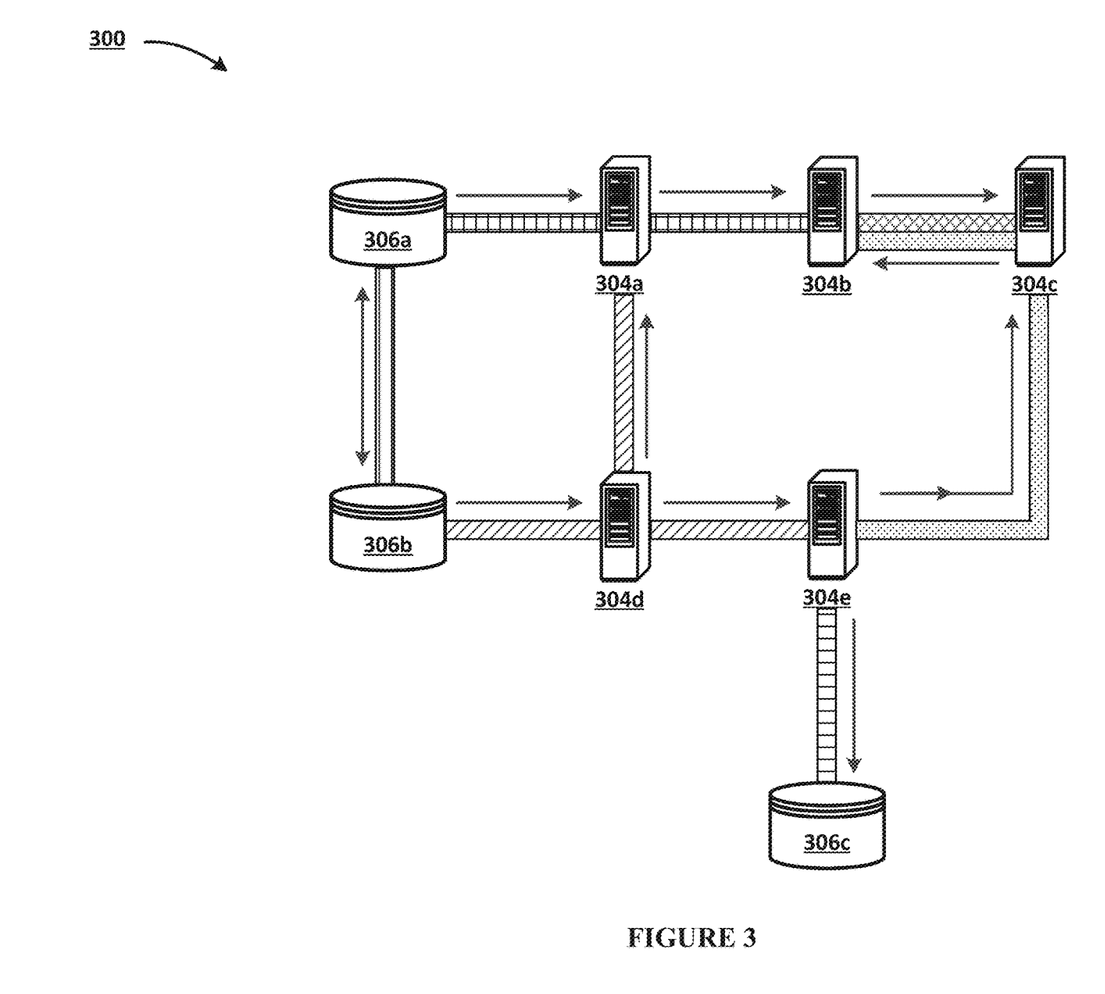
FIG. 3 illustrates a visualization generated by a system for identifying, tagging, and monitoring data flow in a system environment, in accordance with an embodiment of the invention.

In some embodiments, the system may be configured to generate a graphical user interface that includes a visualization, based on the data flow model, depicting one or more of applications and/or systems, one or more data structures, one or more inter-application relationships, one or more application-data-structure relationships, and one or more inter-data-structure relationships. For example, FIG. 3 illustrates a visualization 300 generated by a system for identifying, tagging, and monitoring data flow in a system environment, in accordance with an embodiment of the invention. As shown in FIG. 3, the visualization 300 may include images and/or icons of systems 304a, 304b, 304c, 304d, and 304e representing systems in a system environment. For example, the systems 304a, 304b, 304c, 304d, and 304e in visualization 300 may represent, respectively, the entity systems 204a, 204b, 204c, 204d, and 204e in system environment 200. In some embodiments, the visualization 300 may include images and/or icons of applications that represent applications deployed in a system environment (e.g., applications executed by user input systems, entity systems, data structures, and/or the like).

As also shown in FIG. 3, the visualization 300 may include images and/or icons of data structures 306a, 306b, and 306c representing data structures in a system environment. For example, the data structures 306a, 306b, and 306c may represent, respectively, the data structures 206a, 206b, and 206c in system environment 200.

As noted, the visualization may depict inter-application relationships, application-data-structure relationships, and inter-data-structure relationships. For example, in visualization 300, each of the systems 304a, 304b, 304c, 304d, and 304e may represent an application executed on, supported by, and/or the like the system. In such an example, the visualization 300 may depict the systems 304a, 304b, 304c, 304d, and 304e and/or the data structures 306a, 306b, and 306c in positions relative to each other and/or with visual indications of data flow between the systems 304a, 304b, 304c, 304d, and 304e and/or the data structures 306a, 306b, and 306c that are indicative of the relationships. In some embodiments, and as shown in FIG. 3, the visual indications of data flow may include flow paths having different values of a visual characteristic. For example, the flow paths may have different hashing (e.g., as shown in FIG. 3), different colors, different patterns of different shapes (e.g., squares, triangles, circles, rectangles, hexagons, and/or the like), and/or the like.

As show in FIG. 3, the visualization 300 depicts an inter-application relationship (e.g., a relationship between applications and/or systems) between the application on system 304a and the application on system 304b. As also shown in FIG. 3, the visualization 300 depicts an application-data-structure relationship (e.g., a relationship between an application and/or a system and a data structure) between the application on system 304a and the data structure 306a. As further shown in FIG. 3, the visualization 300 depicts an inter-data-structure relationship (e.g., a relationship between data-structures) between the data structure 306a and the data structure 306b. In some embodiments, the visualization 300 may include indicators of the direction of the data flow. For example, and as shown in FIG. 3, the visualization 300 may include arrows indicating a direction the data flow.

In some embodiments, the visualization 300 may depict multiple relationships and/or visual indications of data flow between systems, applications, data structures, and/or the like in a system environment. For example, and as shown in FIG. 3, the visualization 300 may depict a visual indication of a data flow from an application on system 304b to an application on system 304c and depict another visual indication of another data flow from the application on system 304c to the application on system 304b.

In some embodiments, the system may detect that a system and/or application has changed data and may generate a graphical user interface that includes a visualization 300 depicting the change to the data. For example, the system may detect that system 304e received data from system 304d, changed the data, and transmitted the data to system 304c. In such an example, the system may generate a graphical user interface that includes a visualization 300 depicting the data using an initial value of a visual characteristic and depicting, after the data is changed, the data using a second value of the visual characteristic. For example, and as shown in FIG. 3, the data flow from system 304d to system 304e has a first type of hashing, and the data flow from system 304e to 304c has a second type of hashing to indicate that the data has changed. Additionally, or alternatively, the visualization 300 may depict changes to data using changes to colors, changes to patterns of shapes (e.g., squares, triangles, circles, rectangles, hexagons, and/or the like), and/or the like.

By generating a graphical user interface that includes such a visualization based on the data flow model, the system may visually present information from the data flow model to users, thereby facilitating reconstruction, repair, improvement, maintenance, inspection, and/or the like, which may conserve resources, such as computing resources (e.g., processing resources, memory resources, power resources, communication resources, and/or the like), network resources, physical resources (e.g., power, lifespan of equipment, and/or the like), financial resources, and/or the like.

Figure 4:
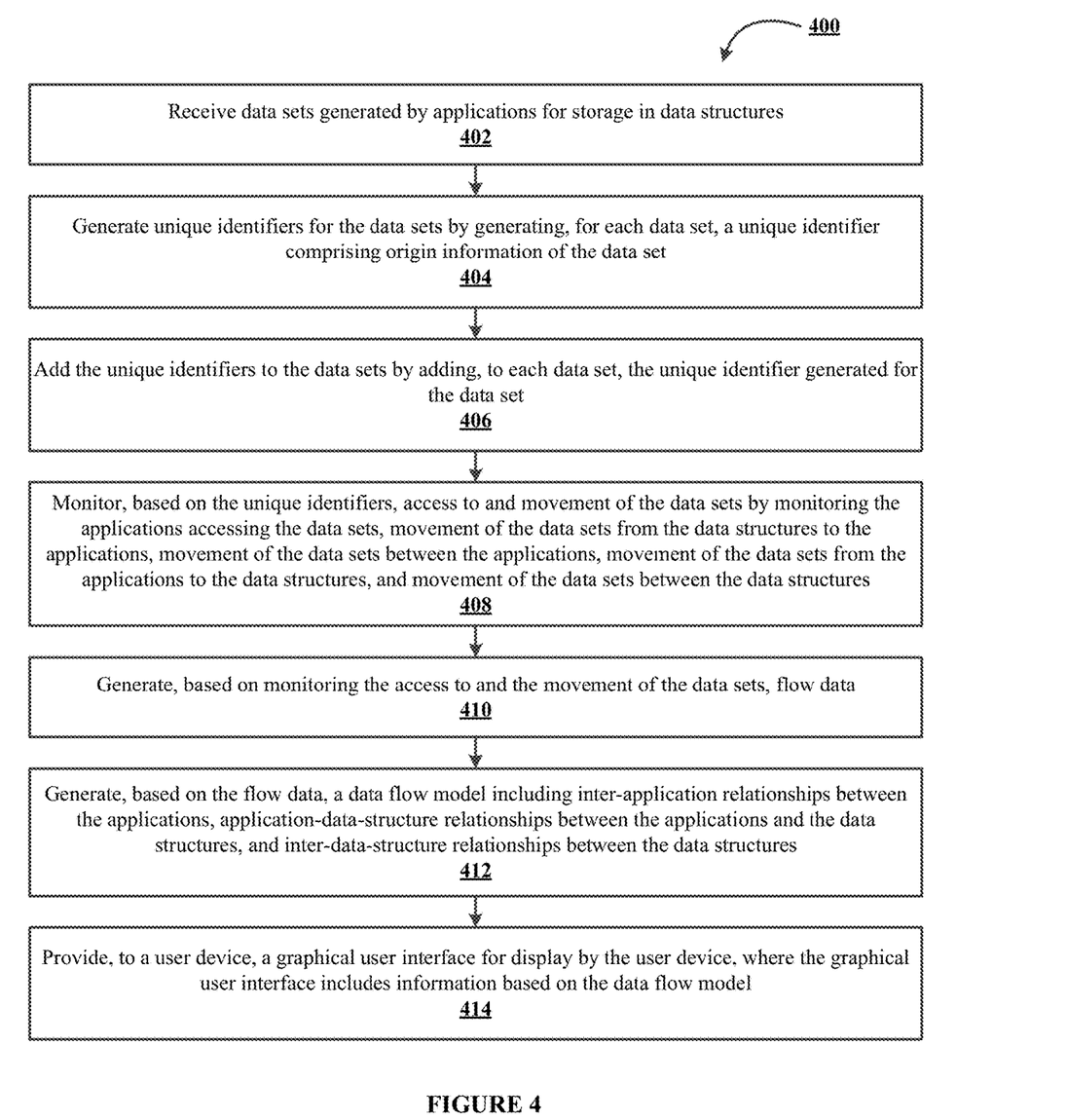
FIG. 4 illustrates a process flow for identifying, tagging, and monitoring data flow in a system environment, in accordance with an embodiment of the invention.

FIG. 4 illustrates a process flow 400 for identifying, tagging, and monitoring data flow in a system environment within a technical environment, in accordance with an embodiment of the invention. In some embodiments, a system (e.g., similar to one or more of the systems described herein with respect to FIGS. 1-3) may perform one or more of the steps of process flow 400. For example, a data flow management system (e.g., the data flow management system 210 described herein with respect to FIG. 2) may perform one or more of the steps of process flow 400.

As shown in block 402, the process flow 400 may include receiving data sets generated by applications for storage in data structures. For example, a data flow management system (e.g., the data flow management system 210 described herein with respect to FIG. 2) may receive data sets generated by applications for storage in data structures.

As shown in block 404, the process flow 400 may include generating unique identifiers for the data sets by generating, for each data set, a unique identifier comprising origin information of the data set. For example, the data flow management system may generate unique identifiers for the data sets by generating, for each data set, a unique identifier comprising origin information of the data set. In some embodiments, the unique identifier for each data set may include an application identifier of an application that generated the data set, information based on a time and date on which the data set was generated, a randomly generated string of characters unique to the data set, and/or the like.

As shown in block 406, the process flow 400 may include adding the unique identifiers to the data sets by adding, to each data set, the unique identifier generated for the data set. For example, the data flow management system may add the unique identifiers to the data sets (e.g., tag the data sets) by adding, to each data set, the unique identifier generated for the data set. In some embodiments, the process 400 may include, when adding the unique identifiers to the data sets, adding, for each data set, the unique identifier generated for the data set to a payload for transmitting the data set.

As shown in block 408, the process flow 400 may include monitoring, based on the unique identifiers, access to and movement of the data sets by monitoring the applications accessing the data sets, movement of the data sets from the data structures to the applications, movement of the data sets between the applications, movement of the data sets from the applications to the data structures, and movement of the data sets between the data structures. For example, the data flow management system may monitor, based on the unique identifiers, access to and movement of the data sets by monitoring the applications accessing the data sets, movement of the data sets from the data structures to the applications, movement of the data sets between the applications, movement of the data sets from the applications to the data structures, and movement of the data sets between the data structures. In some embodiments, the process flow 400 may include, when monitoring, based on the unique identifiers, access to and movement of the data sets, inspecting payloads of packets including the data sets to determine the unique identifiers in the payloads and determining, based on the unique identifiers and for each data set of the data sets, whether an access control is associated with the data set. Additionally, or alternatively, the process flow 400 may include, when monitoring access to and movement of the data sets, detecting that a first user having a first access control level attempted to transmit a first data set to a second user having a second access control level, determining whether the second access control level is lower than the first access control level, preventing, based on determining that the second access control level is lower than the first access control level, transmission of the first data set to the second user, providing, to a third user, a notification requesting an authorization of the transmission, and permitting, based on receiving the authorization from the third user, the transmission of the first data set to the second user.

As shown in block 410, the process flow 400 may include generating, based on monitoring the access to and the movement of the data sets, flow data. For example, the data flow management system may generate, based on monitoring the access to and the movement of the data sets, flow data.

As shown in block 412, the process flow 400 may include generating, based on the flow data, a data flow model including inter-application relationships between the applications, application-data-structure relationships between the applications and the data structures, and inter-data-structure relationships between the data structures. For example, the data flow management system may generate, based on the flow data, a data flow model including inter-application relationships between the applications, application-data-structure relationships between the applications and the data structures, and inter-data-structure relationships between the data structures.

As shown in block 414, the process flow 400 may include providing, to a user device, a graphical user interface for display by the user device, where the graphical user interface includes information based on the data flow model. For example, the data flow management system may provide, to a user device (e.g., similar to user input systems described herein with respect to FIGS. 1 and 2 and/or the like), a graphical user interface for display by the user device, where the graphical user interface includes information based on the data flow model. In some embodiments, the graphical user interface may include a visualization, based on the data flow model, depicting one or more of the applications, one or more of the data structures, one or more of the inter-application relationships, one or more of the application-data-structure relationships, and one or more of the inter-data-structure relationships.

In some embodiments, the process flow 400 may include detecting changes in one or more data sets of the data sets, generating, based on detecting the changes in the one or more data sets and for each data set of the one or more data sets, a new unique identifier including the origin information of the data set and information identifying an application, of the applications, that changed the data set, and adding, to each data set of the one or more data sets, the new unique identifier generated for the data set.

In some embodiments, the process flow 400 may include detecting a change in a first data set of the data sets, where a first application of the applications made the change to the first data set, generating, based on detecting the change in the first data set, a new unique identifier including the origin information of the first data set and information identifying the first application, and add the new unique identifier to the first data set.

In some embodiments, the process flow 400 may include receiving, from the user device, a query including a first set of applications from the applications, determining, based on the data flow model, first inter-application relationships between the first set of applications, first application-data-structure relationships between the first set of applications and a first set of data structures from the data structures with which the first set of applications has an application-data-structure relationship, and first inter-data-structure relationships between the first set of data structures, generating, based on determining the first inter-application relationships, the first application-data-structure relationships, and the first inter-data-structure relationships, a first data flow model for the first set of applications, and providing, to the user device, a first graphical user interface for display by the user device, where the first graphical user interface includes information based on the first data flow model.

In some embodiments, the process flow 400 may include receiving, from the user device, a query including a first data set of the data sets and a time period, determining, based on the flow data, a first set of applications, from the applications, and a first set of data structures, from the data structures, where each of the first set of applications and the first set of data structures are associated with access to and the movements of the first data set during the time period, and providing, to the user device, a first graphical user interface for display by the user device, where the first graphical user interface includes information identifying the first set of applications and the first set of data structures.

In some embodiments, the process flow 400 may include determining, based on the data flow model, first inter-application relationships between the first set of applications, first application-data-structure relationships between the first set of applications and the first set of data structures, and first inter-data-structure relationships between the first set of data structures and generating, based on determining the first inter-application relationships, the first application-data-structure relationships, and the first inter-data-structure relationships, a first data flow model, and where the first graphical user interface includes information based on the first data flow model. Additionally, or alternatively, the first graphical user interface may include a visualization, based on the first data flow model, depicting the first set of applications, the first set of data structures, the first inter-application relationships, the first application-data-structure relationships, the first inter-data-structure relationships, and movements of the first data set during the time period. In some embodiments, the visualization, when depicting movements of the first data set during the time period, may depict the first data set using an initial value of a visual characteristic and may depict, after the first data set is changed, the first data set using a second value of a visual characteristic.

In some embodiments, the process flow 400 may include detecting a change in a first data set of the data sets, determining, based on the flow data, whether the change in the first data set is unexpected and/or determining, based on predetermined rules, whether the change in the first data set is not permitted, and providing, to a user and based on determining that the change in the first data set is unexpected or not permitted, a notification including information associated with the change in the first data set.

Additionally, or alternatively, the process flow 400 may include, when determining whether the change in the first data set is unexpected, determine, using artificial intelligence, whether the change in the first data set is unexpected. The data flow management system may, in some embodiments, use artificial intelligence to analyze the flow data and/or the data flow model to identify patterns of detected changes to data sets and, if a detected change to a data set, does not correspond to an identified pattern, determine that the change is unexpected. For example, the data flow management system may use artificial intelligence to determine that a data set is changed every day to have a new date and to include two new columns. The data flow management system may detect that the data set is changed twice in one day, to include three new columns, to remove a column, to remove a row, and/or in another way that does not correspond to the pattern of changing every day to have a new date and to include two new columns. Based on detecting such a change, the data flow management system may provide, to one or more user devices, an alert, a notification, a message, and/or the like (e.g., including information regarding the detected change and/or the like).

In some embodiments, the process flow 400 may include analyzing the flow data using artificial intelligence to generate the data flow model. Additionally, or alternatively, the process flow 400 may include analyzing the flow data and/or the data flow model using artificial intelligence to determine a typical pattern of data flow for a system environment. The data flow management system may determine, whether a current pattern of data flow in the system environment corresponds to the typical pattern, and provide, based on determining that the current pattern of data flow does not correspond to the typical pattern and to one or more user devices, an alert, a notification, a message, and/or the like. Additionally, or alternatively, the process flow 400 may include analyzing the typical pattern of data flow for a system environment using artificial intelligence to determine an optimal data flow for the system environment, one or more vulnerabilities (e.g., to unauthorized access, to unauthorized data manipulation, extraction, and/or the like, to failure, and/or the like) of the system environment, optimal arrangement of applications, systems, and/or data structures within the system environment, and/or the like (e.g., to conserve resources, such as computing resources, network resources, physical resources, financial resources, and/or the like associated with constructing, maintaining, inspecting, reconstructing, securing, and/or the like the system environment).

Although descriptions of FIG. 4 include a system performing one or more of the steps of process flow 400, in some embodiments, one or more user devices, with or without assistance from another system, may perform one or more of the steps of process flow 400. Additionally, or alternatively, the one or more user devices may provide data and/or information to another system and perform one or more of the steps of process flow 400 in conjunction with the other system (e.g., in real-time or near real-time).

In some embodiments, the process flow 400 may include performing one or more of the functions described herein using artificial intelligence, machine learning, and/or a machine learning model. For example, a system (e.g., a data flow management system and/or the like) may provide flow data, data flow models, and/or the like to a machine learning model trained (e.g., using historical data) to output expected patterns of data changes, optimal data flows, vulnerabilities, optimal arrangements in a system environment, and/or the like.

In some embodiments, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, an LDA etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system can additionally or alternatively leverage a probabilistic module, heuristic module, deterministic module, or any other suitable module leveraging any other suitable computation method, machine learning method or combination thereof. However, any suitable machine learning approach can otherwise be incorporated in the system. Further, any suitable model (e.g., machine learning, non-machine learning, etc.) can be used in generating data relevant to the system. In some embodiments, the one or more machine learning algorithms may be predictive modeling algorithms configured to use data and statistics to predict outcomes with forecasting models.

In some embodiments, the machine learning model may be generated by training on data regarding flow data, data flow models, and/or the like over a predetermined past period of time. In doing so, the system may be configured to determine expected patterns of data changes, optimal data flows, vulnerabilities, optimal arrangements in a system environment, and/or the like.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for identifying, tagging, and monitoring data flow in a system environment, the system comprising:
   at least one non-transitory storage device;
   at least one processing device coupled to the at least one non-transitory storage device, wherein the at least one processing device is configured to:
   receive data sets generated by applications for storage in data structures;
   generate unique identifiers for the data sets by generating, for each data set, a unique identifier comprising origin information of the data set;
   add the unique identifiers to the data sets by adding, to each data set, the unique identifier generated for the data set;
   monitor, based on the unique identifiers, access to and movement of the data sets by monitoring the applications accessing the data sets, movement of the data sets from the data structures to the applications, movement of the data sets between the applications, movement of the data sets from the applications to the data structures, and movement of the data sets between the data structures;

generate, based on monitoring the access to and the movement of the data sets, flow data;

generate, based on the flow data, a data flow model comprising inter-application relationships between the applications, application-data-structure relationships between the applications and the data structures, and inter-data-structure relationships between the data structures; and provide, to a user device, a graphical user interface for display by the user device, wherein the graphical user interface comprises information based on the data flow model.

2. The system of claim 1, wherein the at least one processing device is configured to:

detect changes in one or more data sets of the data sets;

generate, based on detecting the changes in the one or more data sets and for each data set of the one or more data sets, a new unique identifier comprising the origin information of the data set and information identifying an application, of the applications, that changed the data set; and add, to each data set of the one or more data sets, the new unique identifier generated for the data set.

3. The system of claim 1, wherein the at least one processing device is configured to:

detect a change in a first data set of the data sets, wherein a first application of the applications made the change to the first data set;

generate, based on detecting the change in the first data set, a new unique identifier comprising the origin information of the first data set and information identifying the first application; and add the new unique identifier to the first data set.

4. The system of claim 1, wherein the at least one processing device is configured to, when monitoring, based on the unique identifiers, access to and movement of the data sets:

inspect payloads of packets comprising the data sets to determine the unique identifiers in the payloads; and determine, based on the unique identifiers and for each data set of the data sets, whether an access control is associated with the data set.

5. The system of claim 1, wherein the at least one processing device is configured to:

receive, from the user device, a query comprising a first set of applications from the applications;

determine, based on the data flow model, first inter-application relationships between the first set of applications, first application-data-structure relationships between the first set of applications and a first set of data structures from the data structures with which the first set of applications has an application-data-structure relationship, and first inter-data-structure relationships between the first set of data structures;

generate, based on determining the first inter-application relationships, the first application-data-structure relationships, and the first inter-data-structure relationships, a first data flow model for the first set of applications; and provide, to the user device, a first graphical user interface for display by the user device, wherein the first graphical user interface comprises information based on the first data flow model.

6. The system of claim 1, wherein the unique identifier for each data set comprises at least one of:

an application identifier of an application that generated the data set;

information based on a time and date on which the data set was generated; or a randomly generated string of characters unique to the data set.

7. The system of claim 1, wherein the graphical user interface comprises a visualization, based on the data flow model, depicting one or more of the applications, one or more of the data structures, one or more of the inter-application relationships, one or more of the application-data-structure relationships, and one or more of the inter-data-structure relationships.

8. The system of claim 1, wherein the at least one processing device is configured to:

receive, from the user device, a query comprising a first data set of the data sets and a time period;

determine, based on the flow data, a first set of applications, from the applications, and a first set of data structures, from the data structures, wherein each of the first set of applications and the first set of data structures are associated with access to and the movements of the first data set during the time period; and provide, to the user device, a first graphical user interface for display by the user device, wherein the first graphical user interface comprises information identifying the first set of applications and the first set of data structures.

9. The system of claim 8, wherein the at least one processing device is configured to:

determine, based on the data flow model, first inter-application relationships between the first set of applications, first application-data-structure relationships between the first set of applications and the first set of data structures, and first inter-data-structure relationships between the first set of data structures; and generate, based on determining the first inter-application relationships, the first application-data-structure relationships, and the first inter-data-structure relationships, a first data flow model, wherein the first graphical user interface comprises information based on the first data flow model.

10. The system of claim 9, wherein the first graphical user interface comprises a visualization, based on the first data flow model, depicting:

the first set of applications;
the first set of data structures;
the first inter-application relationships;
the first application-data-structure relationships;
the first inter-data-structure relationships; and
movements of the first data set during the time period.

11. The system of claim 10, wherein the visualization, when depicting movements of the first data set during the time period:

depicts the first data set using an initial value of a visual characteristic; and depicts, after the first data set is changed, the first data set using a second value of the visual characteristic.

12. The system of claim 1, wherein the at least one processing device is configured to, when monitoring access to and movement of the data sets:

detect that a first user having a first access control level attempted to transmit a first data set to a second user having a second access control level;

determine whether the second access control level is lower than the first access control level;

prevent, based on determining that the second access control level is lower than the first access control level, transmission of the first data set to the second user;

provide, to a third user, a notification requesting an authorization of the transmission; and permit, based on receiving the authorization from the third user, the transmission of the first data set to the second user.

13. The system of claim 1, wherein the at least one processing device is configured to, when adding the unique identifiers to the data sets:

add, for each data set, the unique identifier generated for the data set to a payload for transmitting the data set.

14. The system of claim 1, wherein the at least one processing device is configured to:

detect a change in a first data set of the data sets;

at least one of:

determine, based on the flow data, whether the change in the first data set is unexpected; or determine, based on predetermined rules, whether the change in the first data set is not permitted; and provide, to a user and based on determining that the change in the first data set is unexpected or not permitted, a notification comprising information associated with the change in the first data set.

15. The system of claim 14, wherein the at least one processing device is configured to, when determining whether the change in the first data set is unexpected:

determine, using artificial intelligence, whether the change in the first data set is unexpected.

16. A computer program product for identifying, tagging, and monitoring data flow in a system environment, the computer program product comprising a non-transitory computer-readable medium comprising code causing a first apparatus to:

receive data sets generated by applications for storage in data structures;

generate unique identifiers for the data sets by generating, for each data set, a unique identifier comprising origin information of the data set;

add the unique identifiers to the data sets by adding, to each data set, the unique identifier generated for the data set;

monitor, based on the unique identifiers, access to and movement of the data sets by monitoring the applications accessing the data sets, movement of the data sets from the data structures to the applications, movement of the data sets between the applications, movement of the data sets from the applications to the data structures, and movement of the data sets between the data structures;

generate, based on monitoring the access to and the movement of the data sets, flow data;

generate, based on the flow data, a data flow model comprising inter-application relationships between the applications, application-data-structure relationships between the applications and the data structures, and inter-data-structure relationships between the data structures; and provide, to a user device, a graphical user interface for display by the user device, wherein the graphical user interface comprises information based on the data flow model.

17. The computer program product of claim 16, wherein the non-transitory computer-readable medium comprises code causing the first apparatus to:

detect changes in one or more data sets of the data sets;

generate, based on detecting the changes in the one or more data sets and for each data set of the one or more data sets, a new unique identifier comprising the origin information of the data set and information identifying an application, of the applications, that changed the data set; and add, to each data set of the one or more data sets, the new unique identifier generated for the data set.

18. The computer program product of claim 16, wherein the non-transitory computer-readable medium comprises code causing the first apparatus to:

detect a change in a first data set of the data sets, wherein a first application of the applications made the change to the first data set;

generate, based on detecting the change in the first data set, a new unique identifier comprising the origin information of the first data set and information identifying the first application; and add the new unique identifier to the first data set.

19. The computer program product of claim 16, wherein the non-transitory computer-readable medium comprises code causing the first apparatus to, when monitoring, based on the unique identifiers, access to and movement of the data sets:

inspect payloads of packets comprising the data sets to determine the unique identifiers in the payloads; and determine, based on the unique identifiers and for each data set of the data sets, whether an access control is associated with the data set.

20. A method for identifying, tagging, and monitoring data flow in a system environment, the method comprising:

receiving data sets generated by applications for storage in data structures;

generating unique identifiers for the data sets by generating, for each data set, a unique identifier comprising origin information of the data set;

adding the unique identifiers to the data sets by adding, to each data set, the unique identifier generated for the data set;

monitoring, based on the unique identifiers, access to and movement of the data sets by monitoring the applications accessing the data sets, movement of the data sets from the data structures to the applications, movement of the data sets between the applications, movement of the data sets from the applications to the data structures, and movement of the data sets between the data structures;

generating, based on monitoring the access to and the movement of the data sets, flow data;

generating, based on the flow data, a data flow model comprising inter-application relationships between the applications, application-data-structure relationships between the applications and the data structures, and inter-data-structure relationships between the data structures; and providing, to a user device, a graphical user interface for display by the user device, wherein the graphical user interface comprises information based on the data flow model.

* * * * *